United States Patent [19]
Carson et al.

[11] 3,916,671
[45] Nov. 4, 1975

[54] GAS CHROMATOGRAPHIC ANALYSIS OF PYROLYSIS PRODUCTS

[75] Inventors: Chester C. Carson, Ballston Spa; Sterling C. Barton; Federico S. Echeverria, both of Scotia, all of N.Y.

[73] Assignee: General Electric Company, Schenectady, N.Y.

[22] Filed: Apr. 8, 1974

[21] Appl. No.: 458,832

[52] U.S. Cl. .............................. 73/23.1; 310/55
[51] Int. Cl.² .................................. G01N 31/08
[58] Field of Search ............ 73/23.1, 23, 27 R, 28; 23/230 PC, 232 R, 232 C, 254 R, 254 E, 253 PC; 317/14 K; 310/55, 56, 66, 68 C

[56] References Cited
UNITED STATES PATENTS

| | | | |
|---|---|---|---|
| 2,988,656 | 6/1961 | Grobel | 310/55 X |
| 3,087,112 | 4/1963 | Pfefferle | 73/23.1 X |
| 3,258,619 | 6/1966 | Davidson | 310/56 |
| 3,361,908 | 1/1968 | Petitjean et al. | 73/23.1 X |
| 3,427,863 | 2/1969 | Schultz | 73/23.1 |
| 3,427,880 | 2/1969 | Grobel et al. | 73/339 R |
| 3,680,359 | 8/1972 | Lynch | 73/23 |
| 3,807,218 | 4/1974 | Carson et al. | 73/28 |

Primary Examiner—Richard C. Queisser
Assistant Examiner—Stephen A. Kreitman
Attorney, Agent, or Firm—John F. Ahern; James W. Mitchell

[57] ABSTRACT

In a gas-cooled dynamoelectric machine, organic coatings and insulations give off submicron pyrolysis particles and gaseous products when overheated. The particles and gases are carried by the machine gas coolant through a sampling and analyzing apparatus which includes a gas chromatographic device. Readings taken from the gas chromatographic device are used to identify the materials emitting the particles and gases; and, hence the source of the over-heating may be located without disassembly of the dynamoelectric machine.

6 Claims, 3 Drawing Figures

GAS CHROMATOGRAPHIC ANALYSIS OF PYROLYSIS PRODUCTS

BACKGROUND OF THE INVENTION

The invention relates generally to a sampling and analyzing apparatus for a gas-cooled dynamoelectric machine and, in particular, relates to a gas chromatographic device for locating overheating portions of the machine.

U.S. Pat. No. 3,427,880, to Grobel et al. issued Feb. 18, 1969 and assigned to the assignee of the present invention describes an overheating detection system for a dynamoelectric machine. An ion chamber detector, of the kind described in U.S. Pat. No. 3,573,460 issued Apr. 6, 1971, to George F. Skala, and assigned to the assignee of the present invention, is used to detect submicron particles given off by various organic materials into the coolant gas of the dynamoelectric machine, when certain machine parts, coated with or comprised of the organic materials, become overheated. These submicron particles given off by thermally decomposing organic materials as the result of localized overheating are known as pyrolysis products. Pyrolysis products of each type of organic material possess identifiable characteristics discernible under gas chromatographic analysis techniques. The Grobel et al. patent is concerned with detecting the presence of pyrolysis products in the gas coolant whereas it is further desirable to locate the source of the pyrolysis products introduced into the dynamoelectric machine gas coolant.

U.S. Pat. application Ser. No. 336,024 filed Feb. 26, 1973 for Carson et al. and assigned to the assignee of the present invention discloses a sampling device contained within a system which can be activated by a signal from an ion chamber detector upon detection of pyrolysis products. The sampling device is removed from the system for gas chromatographic-mass spectrometric analysis so as to locate the source of overheating.

It is further desirable to provide for "on site" identification of the pyrolysis products. Accordingly, one embodiment of the present invention provides a sampling and analyzing apparatus which may be directly connected to the dynamoelectric machine. The apparatus includes a gas chromatographic device downstream from a sampling device and a plurality of valves and conduits which may alternately be used for sampling the gas, heating the gas sample and then running the gas sample through the gas chromatographic device for analysis using a purified carrier gas. The apparatus may be remotely actuated by a signal from an overheating detector device (ion chamber detector). Results are obtained from the gas chromatographic column by using a flame ionization detector and recorder which are known in the art. A second embodiment includes a single valve downstream from a heater and gas purifier which may alternately direct heated gas and purified gas to a gas chromatographic device.

It is one object of the present invention to provide a gas sampling and analyzing device for a gas-cooled dynamoelectric machine.

It is another object of the present invention to provide a sampling and analyzing device in conjunction with an overheating detector for identifying the source of the pyrolysis products.

It is another object of the present invention to obviate removing a gas sample from a dynamoelectric machine for analysis to determine the source of pyrolysis products.

Other objects, advantages and features of the present invention will become apparent from the following detailed description of several embodiments thereof taken in connection with the accompanying drawings.

DETAILED DESCRIPTION OF THE INVENTION

Figure 1:
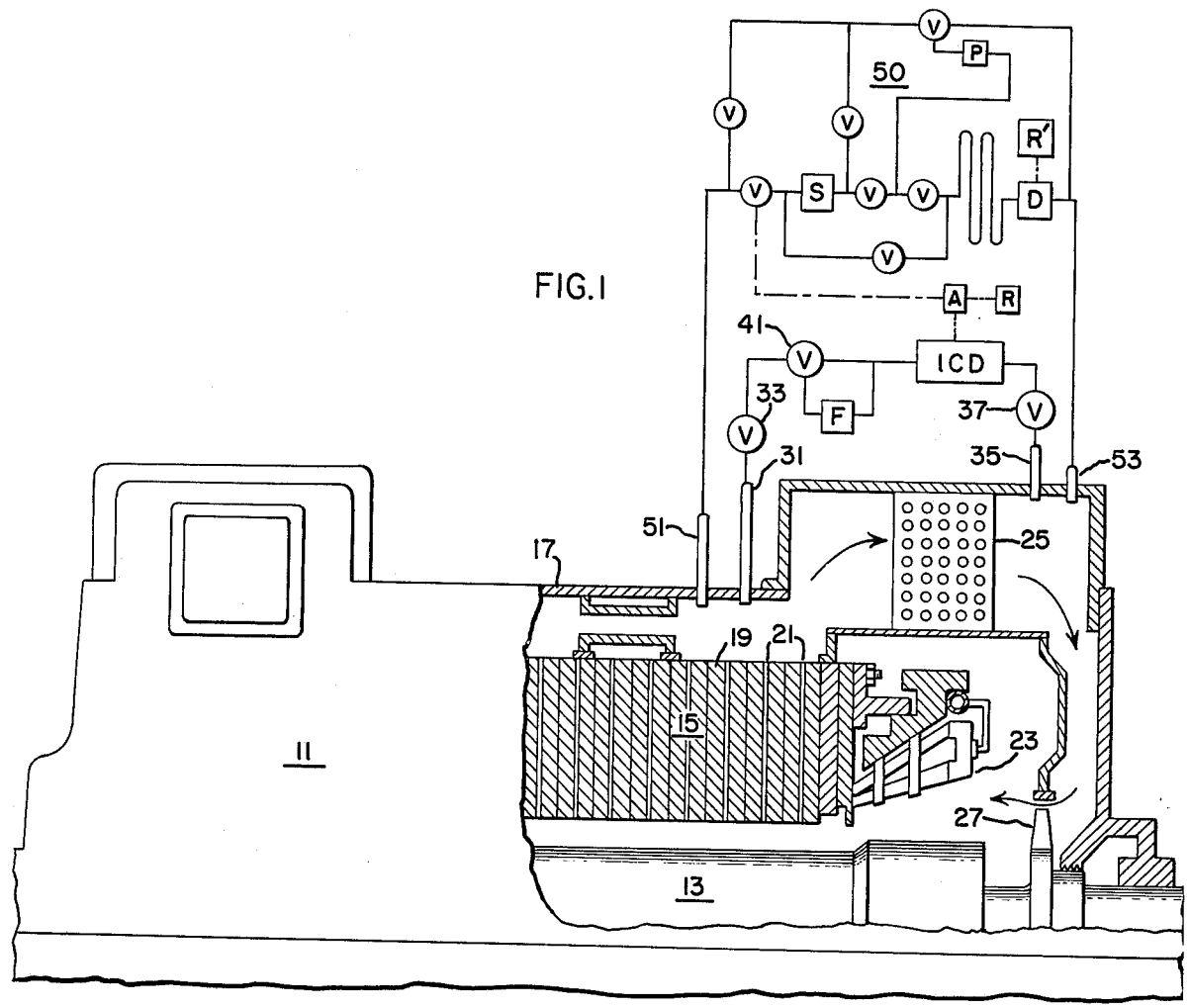
FIG. 1 is an elevation side view, including a cutaway portion, of a dynamoelectric machine having an ion chamber detector attached thereto and according to the present invention an apparatus for sampling and analyzing pyrolysis products.

Referring to FIG. 1, a dynamoelectric machine 11, includes a rotor 13 and a stator core 15 supported within a gas-tight outer casing 17. The stator core is comprised of laminations 19 separated by coolant ducts 21. The laminations are formed with slots for carrying stator windings (not shown), and at either end of the stator core these stator windings are reversed to re-enter the stator core, the reversing portions known as end windings 23. A gas coolant, such as hydrogen, is circulated around the dynamoelectric machine and through cooling ducts 21 in the stator core and further through heat exchangers 25 (only one shown) by a rotor mounted fan 27. Additionally, it is usual to further cool the stator core windings by sending a liquid coolant through the stator windings. It will be appreciated, that it has long been a practice to coat the stator core laminations, end windings, etc., with various organic materials such as epoxy, polymeric resins and other insulations. These organic materials, when overheated, will emit submicron particles and gaseous products as pyrolysis products which are both detectable and identifiable as will be further shown.

A portion of the gas coolant is withdrawn from the high- pressure side of the machine casing at tap 31 including a valve 33; and, the gas coolant is directed back into the low-pressure side of the machine casing at a tap 35 with a valve 37. Thus, gas flow out of and into the machine is caused by pressure differences within the machine casing. An ion chamber detector (ICD) is connected between the high- and low-pressure taps and senses the presence of pyrolysis products carried by the gas coolant. A filter F may be selectively employed to determine the validity of a detector alarm by operation of a valve 41. The detector is electrically connected to an amplifier A and recorder R. The immediate aforementioned discussion is all exemplified, in greater detail, in U.S. Pat. 3,427,880 issued Feb. 18, 1969 to Grobel et al. and assigned to the assignee of the present invention.

The subject matter of the present invention is particularly directed to a sampling and analyzing apparatus 50. The inlet end of the apparatus is attached to a high-pressure tap 51 from the dynamoelectric machine while the outlet end of the apparatus is attached to a low-pressure tap 53.

Figure 2:
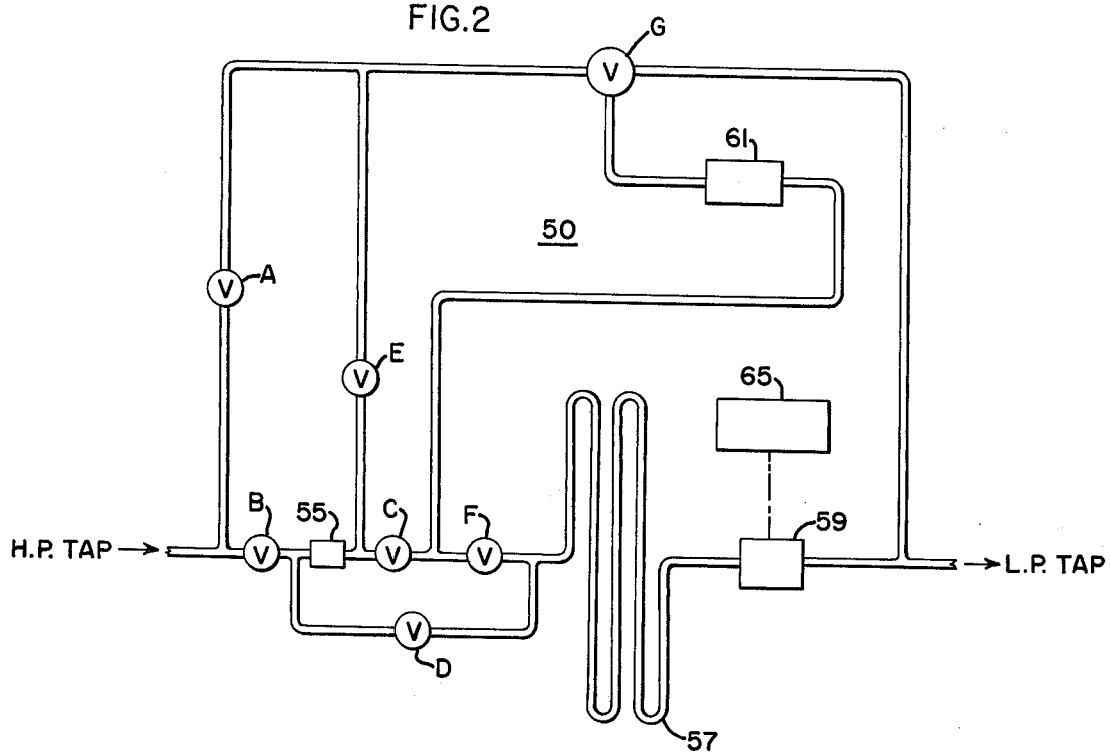
FIG. 2 is an enlarged schematic of one embodiment of the present invention removed from the dynamoelectric machine at high- and low-pressure taps.

Referring to FIG. 2, the sampling and analyzing apparatus includes a sampling device 55 and a gas chromatographic device comprising a gas chromatographic column 57 and a detector 59. The apparatus further includes a gas purifier 61 to make the machine hydrogen pure enough to serve as a carrier gas. Alternatively, a suitable gas such as hydrogen or helium can be obtained from a pressurized cylinder for use as a carrier gas. A second purifier in parallel with purifier 61 but normally closed off from it, by valves, would make it possible to determine whether purifier 61 is functioning properly and to make a quick change to the second purifier if purifier 61 is in need of regeneration. The detector is electrically connected to a recorder 65 for reasons which will become apparent.

The sampling and analyzing apparatus also includes a number of valves A through G for directing gas coolant through the sampling device during the sampling function and for directing gas coolant, until purified, to bypass the sampling device during the analysis step. During the sampling function, valves B, E and F are open whereas valves A, C and D are closed. Valve G, once adjusted, remains open and splits the flow so that a part of the gas always goes through the purifier 61 while the remainder goes to the low-pressure tap or discharge vent. Therefore, during the sampling operation gas coolant, normally hydrogen, from the dynamoelectric machine enters the apparatus through valve B which may be a solenoid valve acting in response to a signal from the ion chamber detector. From valve B the gas passes through the sampler 55, through valves E and G; thereafter, some of the gas passes through purifier 61, through valve F, chromatographic column 57, detector 59 and back to the low-pressure tap 53 of the dynamoelectric machine. The low-pressure tap does not have to be within the dynamoelectric machine and can be a stack to atmosphere (discharge vent) or suitable suction pump forcing the gas back to the dynamoelectric machine.

Sampling device 55 may be of the type disclosed in U.S. patent application Ser. No. 336,024, filed Feb. 26, 1973 for Carson et al. and assigned to the assignee of the present invention. The embodiment shown in FIG. 4 of the aforementioned patent application comprising a baffle structure wherein the baffles are impregnated with silica gel powder is particularly appropriate. A heating element is added to the sampling device for freeing retained pyrolysis products preparatory to the analysis procedure. Suitable heating temperatures are in the range of 500°C to 1000°C as is also described in the foregoing patent application. Other absorbents, such as Chromsorb 101 (which can be heated to only 200°C but which would be suitable only for the gaseous, more volatile products) could be used.

The gas purifier 61 may be any type of purifier capable of purifying the gas coolant of pyrolysis products. A suitable example is a glass fiber filter followed by a suitable charge of activated carbon.

The detector 59 may be a flame ionization which is well known in the gas chromatography art. The detector is electrically connected to a recorder which yields a plot of signal strength versus time (a gas chromatogram), the shape being dependent upon the pyrolysis product being analyzed. The detector reading obtained is compared with known gas chromatograms of generator materials to determine which generator material is overheating.

In the analysis function valves A, C and D are open whereas valves B, E and F are closed. Again, valve G is left open and adjusted so that a suitable flow of gas takes place through purifier 61 while the remainder of the gas goes to low-pressure 53. Presumably, the initial sampling has been completed and it is desired to run pyrolysis products collected on the sampler 55 through the gas chromatograph device. With the valves in the described positions, the heating element in the sampler device is activated and gas entering the apparatus flows through valves A and G, then through purifier 61, valve C, sampling device 55 sampling device 55 (in a reverse-flow configuration), valve D, gas chromatographic column 57, detector 59 and into low-pressure tap 53.

Figure 3:
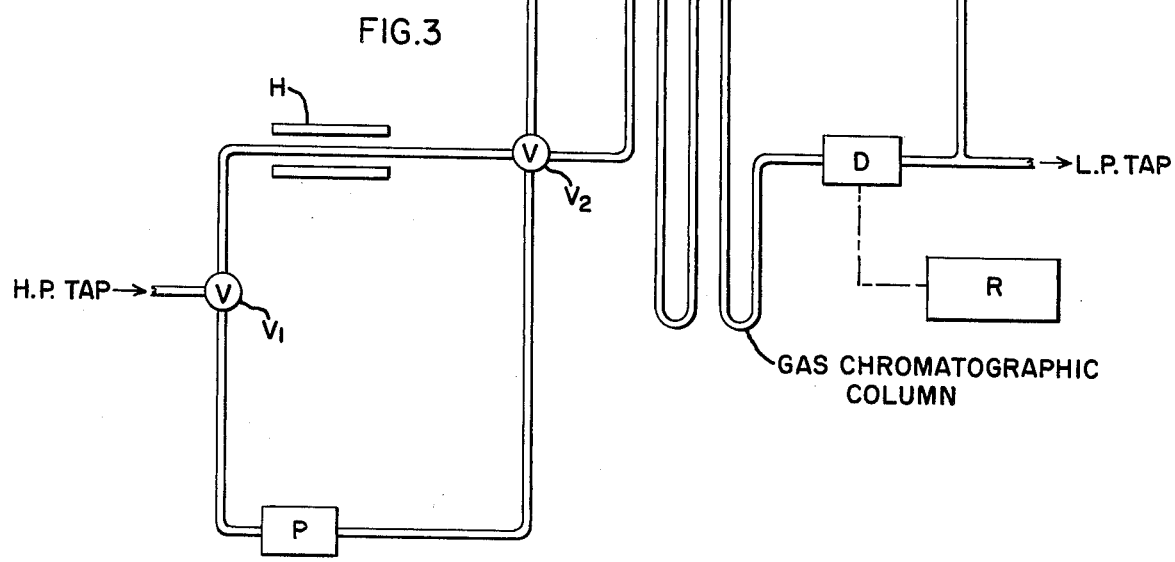
FIG. 3 is an enlarged schematic of a second embodiment of the present invention removed from the dynamoelectric machine at high- and low-pressure taps.

FIG. 3 shows an alternate embodiment of the present invention which is connected at one end to a dynamoelectric machine high-pressure tap and, at the other end, to a low-pressure tap. Gas coolant from the dynamoelectric machine flows through a valve $V_1$ and immediately thereafter is split between one conduit having a heater H positioned along at least a portion of the length thereof and a second conduit which includes a gas purifier P.

Valve $V_2$ (a gas chromatographic sampling valve) downstream from the heater and purifier directs gas from the heater line and purifier line to either the gas chromatographic device or the bypass line depending on whether the sampling function or analyzing function is taking place. The gas chromatographic device again includes a gas chromatographic column and detector. The detector may be a flame ionization detector electrically connected to a recorder as previously described. The bypass line communicates with the valve $V_2$ upstream from the gas chromatographic column and is reconnected downstream from the detector near the low-pressure tap. The operation of the sampling and analyzing apparatus is as follows. During the sampling step, gas coolant is heated to an elevated temperature (600° – 1000°C) to break down any particulate and high-molecular weight pyrolysis products into gaseous products that would lend themselves to gas chromatographic analysis and thereafter channeled through valve $V_2$ and into the bypass line. In the process, a channel which is part of the valve is purged and filled by the heated coolant gas. Simultaneously, the other portion of the gas flow is passed through the purifier and through valve $V_2$ into the gas chromatographic column. During the analytical step valve $V_2$ is adjusted so that the heated coolant gas is now directed into the bypass line while the other portion of the gas flows through the purifier, sweeps the channel (in valve $V_2$) filled with heated coolant gas and then, acting as a carrier gas, flows through the gas chromatographic column. The adjustment of valve $V_2$ for the analytical step can be carried out automatically upon activation by an overheating signal from an ion chamber detector connected to the dynamoelectric machine.

Any suitable material may be used in the gas chromatographic column such as Carbowax 20. However, it is within the scope of the present invention to employ two alternative columns of material in parallel wherein one column could be comprised of Carbowax 20 for separating high-molecular weights while the other column might contain material more suitable for separating low-molecular weights, such as a Porapak porous polymer.

Reference is again made to U.S. patent application Ser. No. 336,024, filed Feb. 26, 1973 for Carson et al. and assigned to the assignee of the present invention wherein Table I gives examples of gas chromatographic analyses of various pyrolysis products.

The specific operation of each embodiment of the sampling and analysis apparatus has been already disclosed. The apparatus can be arranged to yield gas chromatograms at selected time intervals or kept in readiness to produce a gas chromatogram in combination with a detection and alarm system comprising an ion chamber detector. Upon detection of pyrolysis particles, the sampling and analysis apparatus is activated as, for example, by a solenoid valve which receives a signal from the ion chamber detector. When sampling has been completed the apparatus is adjusted to the analysis function whereupon gas chromatograms are compared with those of known generator materials to determine which portion of the machine is yielding pyrolysis products.

The application of gas chromatography as described and shown in the drawings can also serve to indicate the presence of impurities in the coolant gas and the generation of pyrolysis products at a very early stage; this latter function serving to provide the station operator with an additional means (besides the ion chamber detector) of detecting the occurrence of local overheating in a dynamoelectric machine.

While there is shown what are considered, at present, to be the preferred embodiments of the invention, it is, of course, understood that various other modifications may be made therein. Such modifications may include different valve arrangements for directing the gas coolant flow. It is intended to claim all such modifications as fall within the true spirit and scope of the present invention.

What is claimed is:

1. In combination with a gas-cooled dynamoelectric machine, an apparatus for sampling and analyzing thermal decomposition products which may be given off into the gas coolant due to localized overheating of dynamoelectric machine parts, said dynamoelectric machine including a high-pressure tap and a low-pressure tap; and, said apparatus connected between said high-pressure tap and said low-pressure tap further comprising:
   a gas chromatographic column interconnecting said high-pressure tap and said low-pressure tap;
   a sampler device on the upstream side of said column;
   a detector on the downstream side of said column; and,
   means selectively supplying machine gas coolant through said sampler device in the sampling mode and carrier gas through said sampler in the analysis mode.

2. The apparatus recited in claim 1 wherein the selective gas supplying means further includes:
   a first conduit on the high-pressure tap side of the sampler device having a valve therein:
   a second conduit on the low-pressure tap side of the sampler device having a valve therein;
   a third conduit connected at one end to the low-pressure tap side of said sampler device and connected at the other end to said gas chromatographic column;
   a fourth conduit interconnecting said first and second conduits with said third conduit at a connection intermediate the ends of said third conduit; said third conduit further including a first valve between the sampler device and said connection and a second valve between the connection and the gas chromatographic column;
   a valve on the high-pressure tap side of the sampler device between the first conduit and the sampler device; and,
   a fifth conduit having one end connected between said valve on the high-pressure tap side of said sampler device and said sampler device, and the other end connected to said gas chromatographic column; said fifth conduit including a valve therein.

3. The apparatus recited in claim 2 wherein the valve on the high-pressure tap side of the sampler device is a solenoid valve actuated by a signal from an ion chamber detector connected to dynamoelectric machine.

4. The apparatus recited in claim 1 wherein the detector is a flame ionization detector.

5. In combination with a gas-cooled dynamoelectric machine, an apparatus for sampling and analyzing thermal decomposition products which may be given off into the gas coolant due to localized overheating of dynamoelectric machine parts, said dynamoelectric machine including a high-pressure tap and a low-pressure tap; and, said apparatus connected between said high-pressure tap and said low-pressure tap further comprising:
   a gas chromatographic column connected between said high-pressure tap and said low-pressure tap;
   first and second conduits, each connected at one end to the high-pressure tap and each connected at the other end to the high-pressure tap side of the gas chromatographic column;
   a heating device disposed along at least a portion of the first conduit upstream from the gas chromatographic device;
   a gas purifier disposed in the second conduit upstream from the gas chromatographic column;
   a bypass conduit connected at one end to said first and second conduits on the high-pressure tap side of said gas chromatographic column and connected at the other end to the low-pressure tap; and,
   a valve upstream from said gas chromatographic column for selectively supplying machine gas coolant and purified gas coolant to said gas chromatographic column.

6. The apparatus recited in claim 5 wherein the valve upstream from the gas chromatographic column is a solenoid valve actuated by a signal from an ion chamber detector connected to the dynamoelectric machine.

* * * * *